United States Patent [19]

Kumm

[11] Patent Number: 5,451,001
[45] Date of Patent: Sep. 19, 1995

[54] IRRIGATION SYSTEM TOWER SUPPORT WHEEL

[76] Inventor: Glen Kumm, P.O. Box 729, Plainview, Nebr. 68769

[21] Appl. No.: 217,234

[22] Filed: Mar. 25, 1994

Related U.S. Application Data

[63] Continuation of Ser. No. 11,722, Feb. 1, 1993, abandoned.

[51] Int. Cl.⁶ .................. B05B 3/18; B60B 15/00
[52] U.S. Cl. .................. 239/726; 301/43; 301/52; 305/13
[58] Field of Search .................. 239/726–735, 239/737; 301/43, 44.3, 52, 53; 305/13

[56] References Cited

U.S. PATENT DOCUMENTS

| | | | |
|---|---|---|---|
| Re. 26,285 | 10/1967 | Stafford | 239/735 |
| 1,440,183 | 12/1922 | Steele | 301/43 |
| 1,715,841 | 6/1929 | Johnson | 301/43 |
| 1,741,450 | 12/1929 | Coultas | 301/44.3 |
| 1,872,079 | 8/1932 | Harris | 301/52 |
| 1,902,412 | 3/1933 | Melin | 405/36 |
| 2,221,756 | 11/1940 | Burkhardt | 301/43 |
| 3,360,200 | 12/1967 | Purtell | 239/737 |
| 3,465,766 | 9/1969 | Siebert | 239/728 |
| 3,478,773 | 11/1969 | Husky | 239/737 |
| 3,566,911 | 3/1971 | Neier | 239/737 |
| 3,640,462 | 2/1972 | Wagner | 239/735 |
| 3,690,343 | 9/1972 | Crane | 239/731 |
| 3,729,140 | 4/1973 | Wagner | 239/726 |
| 3,993,249 | 11/1976 | Hieb | 239/728 |
| 4,074,783 | 2/1978 | Arndt et al. | 239/728 |
| 4,084,610 | 4/1978 | Boone et al. | 239/735 |
| 5,046,785 | 9/1991 | Bockerman | 301/52 |

FOREIGN PATENT DOCUMENTS

| | | | |
|---|---|---|---|
| 27144 | 6/1931 | Australia | 301/44.3 |
| 565646 | 11/1944 | United Kingdom | 301/43 |
| 1486109 | 6/1989 | U.S.S.R. | 239/728 |

*Primary Examiner*—Karen B. Merritt
*Attorney, Agent, or Firm*—John A. Beehner

[57] ABSTRACT

An irrigation system tower support wheel for use in combination with an irrigation system having one or more tower supports, irrigation means and drive means, the support wheel including a generally cylindrical wheel rim having outer and inner surfaces, first and second edges and a center longitudinal axis, the wheel rim having a generally flat cross-section. The wheel rim further includes first and second inwardly extending peripheral side flanges connected to the first and second edges respectively such that additional rigidity may be imparted to the cylindrical wheel rim. Support struts extend inward towards the center longitudinal axis of the wheel rim, the support struts mounted on the inner surface of the wheel rim. The outer surface of the wheel rim includes a plurality of lugs for improving traction of the wheel. Each of the lugs consists of a longitudinally extended channel having a V-shaped cross-section. Each lug is mounted such that the V-shape is inverted, the lug thus mounted on the outer surface in that position.

15 Claims, 3 Drawing Sheets

IRRIGATION SYSTEM TOWER SUPPORT WHEEL

CROSS-REFERENCE TO RELATED APPLICATION

This application is a continuation of patent application Ser. No. 08/011,722 filed Feb. 1, 1993, now abandoned, for an IRRIGATION SYSTEM TOWER SUPPORT WHEEL.

BACKGROUND OF THE INVENTION

1. Technical Field

This invention relates to wheels for irrigation systems and, more particularly, to an irrigation system tower support wheel having a generally cylindrical steel rim which is generally flat in cross-section, having inwardly extending peripheral side flanges and having a plurality of lugs mounted on the outer surface of the wheel rim, each lug having a V-shaped cross section.

2. Description of the Prior Art

The advent of irrigation systems has allowed for the use of much land which was previously unusable for the farming of crops. As the demand for produce has increased, use of irrigation systems has likewise increased. Many irrigation systems are now used on uneven ground, for example, on hills or in valleys. As the majority of irrigation systems are propelled by powered rotation of their wheels, there is a need for an irrigation system tower support wheel which will provide sufficient traction for propulsion of the irrigation system.

Another problem often encountered in use of irrigation systems is that the wheels of the irrigation system tend to form ruts or tracks which can extend a considerable distance into the ground. When a tractor is run over the same ground, these ruts can cause damage to the tractor, such as cracked axles or flat tires. There is therefore a need for an irrigation system tower support wheel which will substantially reduce the depth and severity of ruts formed in use of the irrigation system. No example has been found in the prior art which directly addresses these two problems encountered in use of irrigation systems.

Therefore, an object of the present invention is to provide an improved irrigation system tower support wheel.

Another object is to provide an irrigation system tower support wheel having a plurality of lugs thereon to provide sufficient traction for an irrigation system to correctly track up and down hills.

Another object of the present invention is to provide an irrigation system tower support wheel having a wide, flat ground-engaging surface to prevent the wheel from causing a substantial rut in the ground as the wheel travels over the ground.

Another object of the present invention is to provide an irrigation system tower support wheel which may be used on a variety of irrigation systems, including but not limited to central pivot irrigation systems.

Another object of the present invention is to provide an irrigation system tower support wheel having inwardly directed peripheral flanges connected to the edges of the outer rim of the wheel to prevent large amounts of mud and/or dirt from entering the interior of the wheel.

Finally, an object of the present invention is to provide an irrigation system tower support wheel which is economical to manufacture and safe and durable in use.

SUMMARY OF THE INVENTION

The present invention provides an irrigation system tower support wheel for use in combination with an irrigation system having one or more tower supports, an irrigation means and a drive means.

The support wheel consists of a generally cylindrical wheel rim having outer and inner surfaces, first and second edges and a center longitudinal axis. The wheel rim has a generally flat cross-section. The wheel also includes first and second inwardly extending peripheral side flanges which are connected to the first and second edges respectively, thereby imparting additional rigidity to the cylindrical wheel rim. Extending inward from the inner surface of the wheel rim towards the center longitudinal axis are support struts which may be connected to the axle of an irrigation system tower support. Mounted on the outer surface of the wheel rim are a plurality of lugs, each lug consisting of a longitudinally extended channel having a V-shaped cross-section. The channel further includes an upper edge which is essentially the base of the V-shaped channel and two lower edges consisting essentially of the two edges on the opening of the V-shaped channel. Each of the lugs is thus mounted on the outer surface of the wheel rim such that each of the lower edges is adjacent to and connected to the outer surface of the wheel rim.

The novel design of this irrigation system tower support wheel has several advantages, one being that the tower support wheel of the present invention is designed to have a wide ground engaging surface which substantially reduces the depth of the wheel tracks produced as the wheel travels over the ground. Furthermore, the V-shaped lugs provide excellent traction for the wheel, thus allowing the wheel to travel up and down inclined surfaces without significant slippage. Finally, the peripheral side flanges connected to the first and second edges of the wheel rim not only impart additional rigidity to the cylindrical wheel rim, but act to prevent significant amounts of mud, dirt or the like from falling onto the inner surface of the wheel rim. These and other advantages will become more apparent in the following descriptions.

DESCRIPTION OF THE PREFERRED EMBODIMENT

Figure 1:
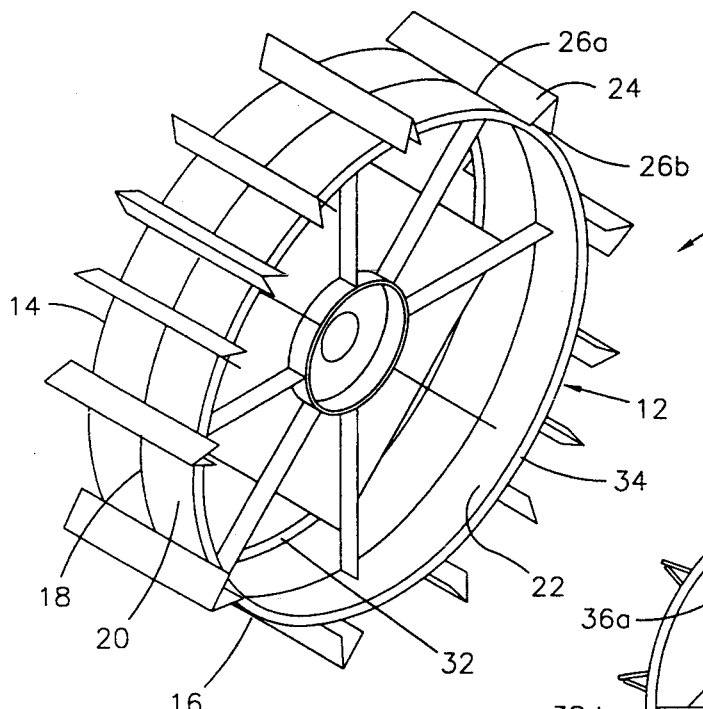
FIG. 1 is a perspective view of the irrigation system tower support wheel of the present invention.

The irrigation system tower support wheel is shown in its preferred embodiment in FIGS. 1–4 as including a cylindrical wheel rim 12 constructed of adjoining cylindrical sections 14 and 16. The preferred diameter for each cylindrical section 14 and 16 is in a range of 35" to 60", with the preferred measurement being 46". The preferred width of each cylindrical section 14 and 16 is in a range of 4", to 8" thus making the overall width of the cylindrical wheel rim 12 between 8", to 16" with a preferred overall width of 12". As shown in FIG. 1, the left and right cylindrical sections 14 and 16 may be attached to one another by a continuous circumferential weld 18, thus forming a cylindrical wheel rim 12 having no openings or passages from the outer surface 20 of the cylindrical wheel rim 12 to the inner service 22 of the cylindrical wheel rim 12. It is preferred that the left and right cylindrical sections 14 and 16 be constructed of heavy-gauge steel plate or other such rigid, wear-resistant material.

Mounted on the outer surface 20 of the cylindrical wheel rim 12 are a plurality of lugs 24, each having a V-shaped cross-section. As best shown in FIG. 1, each lug 24 is preferably mounted on the outer surface 20 of the cylindrical wheel rim 12 such that the lower edges 26a and 26b of each lug 24 are in contact with the outer surface 20 of the cylindrical wheel rim 12. It is preferred that the each of the lugs 24 be mounted such that the lug 24 extends longitudinally perpendicular to the continuous circumferential weld 18 in the cylindrical wheel rim 12. However, this mounting is not critical to the invention, and thus may be modified to suit the individual needs of the user.

Figure 2:
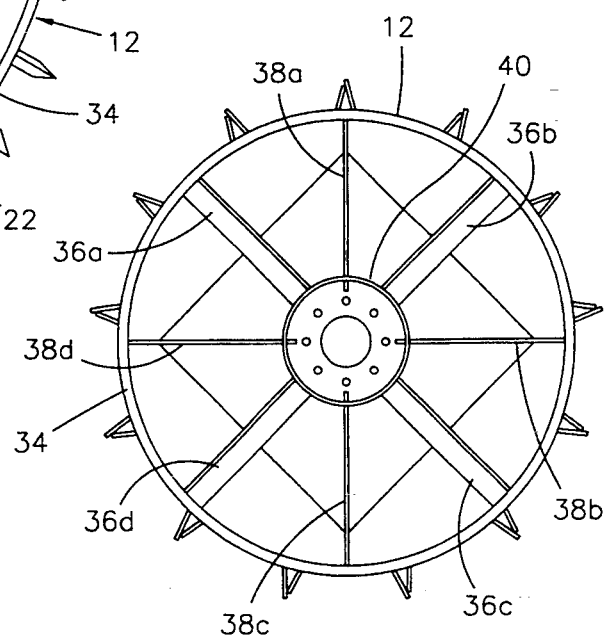
FIG. 2 is a side elevational view of the wheel showing the exterior wheel side.
Figure 3:
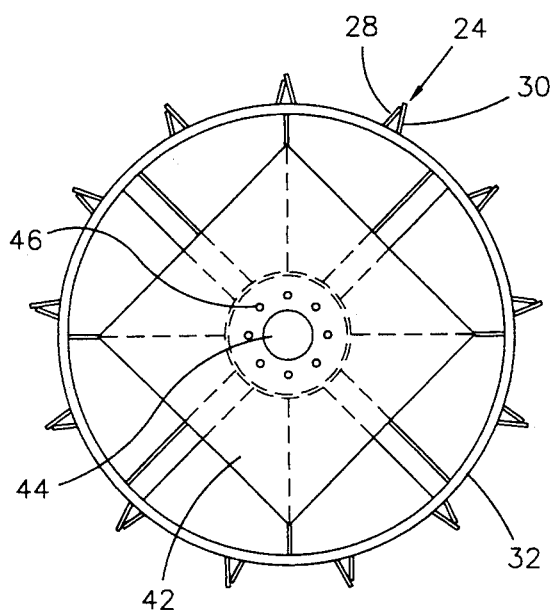
FIG. 3 is a side elevational view of the wheel of the present invention showing the interior side of the wheel.

It is preferred that a lug 24 be constructed in one of two ways. In the first method of construction, a flat rectangular plate having long and short sides is bent parallel to the long sides and at the mid-point of the short sides, thus forming a V-shaped channel, as shown in FIG. 1. It is preferred that the angle between the plate surfaces be in a range of 15° to 90°, the preferred angle being approximately 30°. Alternatively, two rectangular plates 28 and 30 may be welded together as shown in FIGS. 2 and 3 to form the V-shaped lug 24 of the present invention.

Figure 4:
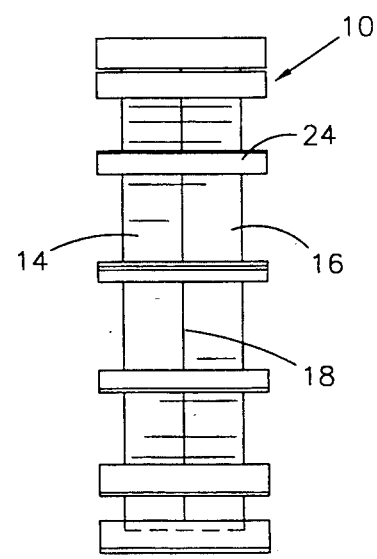
FIG. 4 is a front elevational view of the wheel of the present invention.

As shown in FIGS. 1 and 4, it is preferred that the lugs 24 extend outward oppositely past opposite edges of the cylindrical wheel rim 12. This design component is important for the following reasons. First, greater lug length results in greater traction provided for the wheel 10 of the present invention. Furthermore, when the lug 24 has an overhang, such as shown in FIG. 4, mud and dirt lodged in the interior of the lug 24 may be forced out through contact with the ground, thus keeping the interior area of the lug 24 substantially freer of mud and dirt than would otherwise be possible. The lugs 24 thus provide positive traction for the wheel 10 of the present invention.

Mounted on opposite edges of the cylindrical wheel rim 12 are left and right side flanges 32 and 34 which each extend inward towards the center of the cylindrical wheel rim 12. These side flanges 32 and 34 are best shown in FIGS. 1-3, and are preferably constructed of heavy-gauge metal plate. It is preferred that the width of each side flange 32 and 34 be between ½" and 3", with the preferred width being approximately 1". The side flanges 32 and 34 provide additional structural rigidity to the cylindrical wheel rim 12 and additionally act to retard intrusion of mud and dirt into the interior area of the cylindrical wheel rim 12.

Figure 5:
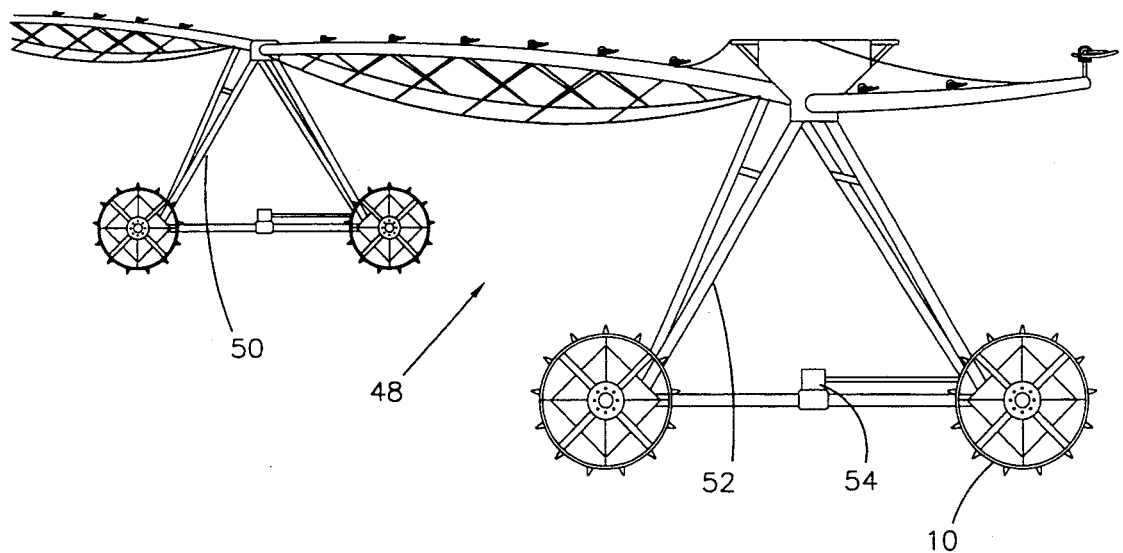
FIG. 5 is a perspective view of the wheel of the present invention mounted on an A-frame tower as is commonly found on center pivot irrigation systems.
Figure 6:
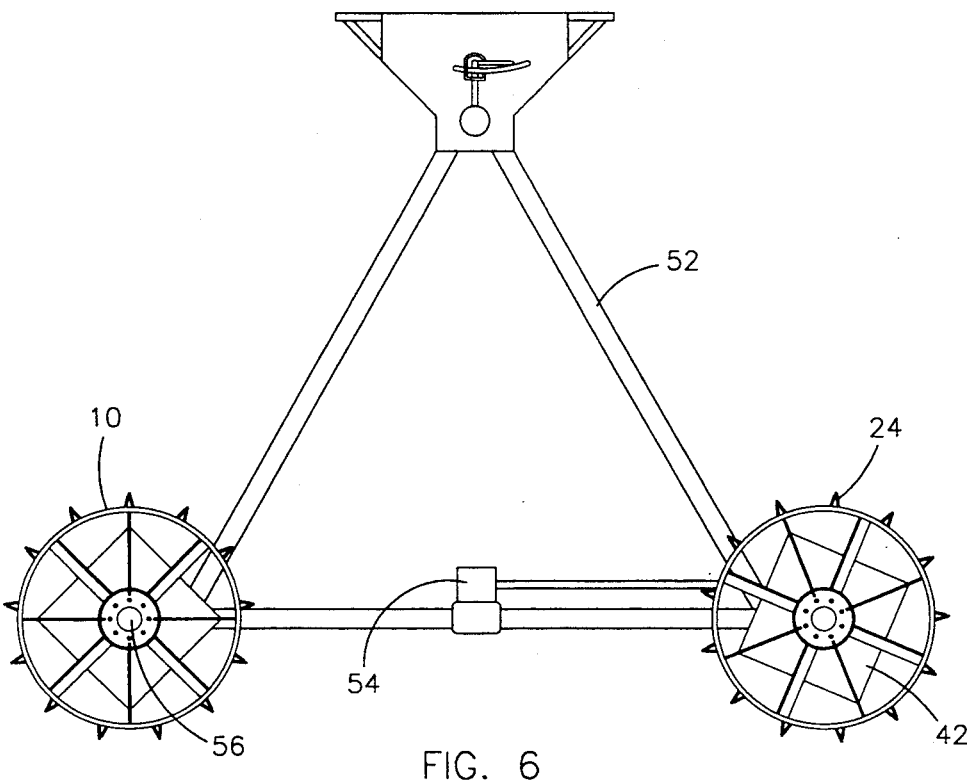
FIG. 6 is a side elevational view of the wheel of the present invention mounted on an A-frame tower.

Extending inward from the inner surface 22 of the cylindrical wheel rim 12 are a plurality of spokes 36a-d and 38a-d, each connected to a central cylindrical wheel hub 40. Spokes 36a-d are preferably constructed of angle iron, as shown in FIG. 2, and spokes 38a-d are preferably constructed of flat iron as shown in FIG. 2. However, this spoke construction is only one of many alternative construction forms, any of which may be acceptable as long as sufficient support is provided between the center cylindrical wheel hub 40 and cylindrical wheel rim 12. Mounted on and connected to the inner surface of the spokes 36a-d and 38a-d is a square plate 42, as shown in FIGS. 2 and 3. It is preferred that the square plate 42 be constructed of heavy-gauge metal plate and be welded to each of the spokes 36a-d and 38a-d and to the center cylindrical wheel hub 40. At the center of the square plate 42, a plurality of holes are preferably formed therethrough, including a center axle hole 44 and a plurality of lug bolt holes 46. When the holes are formed in this manner, the wheel 10 may be mounted on an irrigation system 48 as shown in FIGS. 5 and 6.

The irrigation system 48 preferably includes a plurality of tower supports 50 and 52 each of which may be propelled over the ground by a motor 54 or other propulsion device. A tower support wheel 10 may be rotatably mounted on an axle 56, shown in FIG. 6. The wheel 10 may thus rotate to propel the irrigation system 48 over the ground. The rotational axis is preferably perpendicular to the continuous circumferential weld 18 found on the cylindrical wheel 12.

Figure 7:
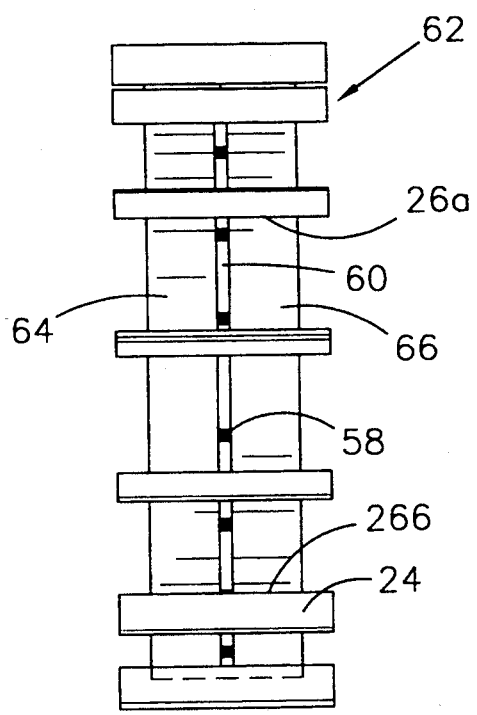
FIG. 7 is a front elevational view of an alternative embodiment of the wheel of the present invention which has a narrow gap between the two cylindrical sections of the wheel.

An alternative embodiment of the cylindrical wheel rim 12 of the present invention is shown in FIG. 7 as including left and right cylindrical sections 64 and 66 connected to one another by a series of circumferentially spaced welds 58 thus forming a plurality of water-releasing gaps 60 whereby water or mud, or dirt fell within the cylindrical wheel rim 62 may be released. To provide additional securement between the left and right cylindrical sections 64 and 66, each of the lower edges 26a and 26b of the lugs 24 are welded to each of the left and right cylindrical sections 64 and 66, each lug 24 thus acting as a type of bridge between the two sections 64 and 66. It is preferred that the gap be no larger than 1" wide, but this dimension is not critical to the invention.

The thus described irrigation system tower support wheel 10 provides a substantial improvement over other wheels found in the prior art. The V-shaped lugs increase the traction of the wheel, thus allowing the wheel to travel over inclined ground. Furthermore, the width of the wheel is such that a large ground engaging surface is provided to prevent the wheel of the present invention from creating large ruts or depressions in the ground as the wheel rolls thereover. Finally, as the wheel of the present invention is sturdily constructed, wear is greatly reduced and repair costs are significantly lessened.

Another improvement over the prior art is that when the wheel of the present invention is used on an irrigation system, the irrigation system may travel through wetlands without getting stuck therein or slipping due to the wet surface. When irrigating large plots of ground which have hills and valleys, oftentimes there are areas in the irrigated section that are below the level of the water table, thus resulting in wetlands or a marsh area. Irrigation systems having balloon tires cannot pass through the wet land areas, as the balloon tires slip and become stuck in the wet area. This means that the irrigation system must reverse its path and circle completely around to irrigate the opposite side of the wetlands area. The time involved and cost involved can quickly become unmanageable and uneconomical. As the wheel of the present invention passes through a wetlands area, however, the wide, flat ground-engaging surface allows the wheel to resist sinking into the wet ground, and the V-shaped lugs provide sufficient traction for the wheel to properly track through the wet area. Irrigation time and money are thus saved, a greater percentage of the total land area available for farming may be used, and thus the present invention provides a substantial improvement over the prior art.

The lugs of the invention will provide sufficient traction in many instances to climb the sides of terraces. Terraces are found in very hilly farm country and involve a sharply angled incline on top of which is a generally level farming surface, each hill generally having a series of terraces to allow farming thereon. Prior art does not allow for irrigation over these terraces, especially when using standard central pivot irrigation systems. However, when the wheel of the present invention is used on a center pivot irrigation system, sufficient traction is provided to climb the sharp inclines found on terraces thus allowing for irrigation of terraces. It is therefore, very important to this invention that the lugs be of a V-shape to provide a large amount of traction and that the wheel surface be wide and flat to provide a large ground-engaging surface area.

While the present invention has been described in conjunction with an irrigation system, it is to be understood that the present invention may be used on any tractor-type vehicle for which it is desirable to provide great amounts of traction on the wheel surfaces. Therefore, the wheel of the present invention may be used with a variety of agricultural and construction vehicles.

It is to be understood that the above description is not intended to in any way to limit the scope of the present invention, which shall follow from the claims set forth below.

There has thus been set forth and described an invention which accomplishes at least all of the stated objectives.

I claim:

1. An irrigation system tower support wheel for use in combination with an irrigation system having at least one tower support, irrigation means and drive means, said support wheel comprising;
    a generally cylindrical wheel rim having outer and inner surfaces, first and second edges and a center longitudinal axis;
    said wheel rim having a generally flat cross-section;
    said wheel rim further comprising first and second inwardly extending peripheral side flanges connected to said first and second edges respectively, such that additional rigidity may be imparted to said cylindrical wheel rim;
    a plurality of lugs mounted on said outer surface of said wheel rim;
    each of said lugs comprising a longitudinally extended channel having a V-shaped cross-section, said channel further having an upper edge comprising the base of the V-shaped channel and two lower edges comprising the open edges of the V-shaped channel;
    each of said lugs mounted on said outer surface of said wheel rim such that each of said lower edges is adjacent and connected to said outer surface;
    each of said lugs extending substantially continuously across the entire width of said outer surface of said wheel rim; and
    each of said lugs extending substantially parallel with said center longitudinally axis of said wheel rim.

2. The irrigation system tower support wheel of claim 1 wherein said cylindrical wheel rim has a rim width, as measured parallel to said center longitudinal axis along said outer surface of said wheel rim, greater than one-fifth (1/5) of a diameter of said cylindrical wheel rim.

3. The irrigation system tower support wheel of claim 2 wherein each of said lugs has a length greater than the width of said rim such that at least one end of each of said lugs may overhang at least one of said first and second edges of said cylindrical wheel rim.

4. The irrigation system tower support wheel of claim 1 wherein said cylindrical wheel rim comprises two cylindrical sections connected to one another in concentric relation thereby forming said cylindrical wheel rim.

5. The irrigation system tower support wheel of claim 4 wherein said cylindrical sections are welded to one another at circumferentially spaced locations such that a water-releasing gap is formed between said cylindrical sections whereby water held within said wheel may be released.

6. The irrigation system tower support wheel of claim 1 wherein said cylindrical wheel rim is free of openings extending between said outer and inner surfaces whereby mud and dirt may be prevented from passing therethrough.

7. The irrigation system tower support wheel of claim 1 wherein said support means comprises a plurality of spokes and a center hub, said spokes extending between and connected to said inner surface of said cylindrical wheel rim and said center hub, said center hub being supported adjacent said center longitudinal axis such that said wheel rim may be rotatably mounted on an axle having an axis of rotation collinear with said center longitudinal axis.

8. The irrigation system tower support wheel of claim 7 wherein said support means further comprises a generally rectangular plate mounted on and extending between at least some of said spokes, said plate mounted substantially perpendicular to said center longitudinal axis of said cylindrical wheel rim.

9. The irrigation system tower support wheel of claim 1 wherein each of said lugs comprises a rectangular plate folded at the midsection thereof such that a V-shaped channel is formed.

10. The irrigation system tower support wheel of claim 1 wherein each of said lugs comprises first and second rectangular plates each having long and short sides, said first rectangular plate connected to said second rectangular plate along adjacent long sides such that a V-shaped channel is formed.

11. The irrigation system tower support wheel of claim 1 wherein each of said lugs is mounted on said outer surface of said cylindrical wheel rim such that said longitudinally extended channel is generally parallel with said center longitudinal axis of said wheel rim.

12. The irrigation system tower support wheel of claim 1 wherein said wheel rim, said support means and said lugs comprise a metal material such that said wheel rim, said support means and said lugs are sufficiently rigid to support said tower support.

13. In combination, an irrigation system having at least one tower support, irrigation means and drive means;

at least one irrigation system tower support wheel, each of said wheels comprising;

a generally cylindrical wheel rim having outer and inner surfaces, first and second edges and a center longitudinal axis;

said wheel rim having a generally flat cross-section;

said wheel rim free of openings extending between said outer and inner surfaces whereby mud and dirt may be prevented from passing therethrough;

said wheel rim further comprising first and second inwardly extending peripheral side flanges connected to said first and second edges respectively, such that additional rigidity may be imparted to said cylindrical wheel rim;

support means extending inward towards said center longitudinal axis, said support means mounted on said inner surface of said wheel rim;

support means extending inward towards said center longitudinal axis, said support means mounted on said inner surface of said wheel rim;

said support means adapted to be rotatably mounted on one of said tower supports such that said tower support may roll thereon;

a plurality of lugs mounted on said outer surface of said wheel rim;

each of said lugs comprising a longitudinally extended channel having an upper edge comprising the base of the V-shaped channel and two lower edges comprising the open edges of the V-shaped channel;

each of said lugs mounted on said outer surface of said wheel rim such that each of said lower edges is adjacent and connected to said outer surface;

each of said lugs extending substantially across the entire width of said outer surface of said wheel rim; and each of said lugs extending substantially parallel with said center longitudinal axis of said wheel rim.

14. An irrigation system tower support wheel for use in combination with an irrigation system having at least one tower supports, irrigation means and drive means, said support wheel comprising;

a generally cylindrical wheel rim having outer and inner surfaces, first and second edges and a center longitudinal axis;

said wheel rim having a generally flat cross-section;

said wheel rim further comprising first and second inwardly extending peripheral side flanges connected to said first and second edges respectively, such that additional rigidity may be imported to said cylindrical wheel rim;

said cylindrical wheel rim having a rim width, as measured parallel to said center longitudinal axis along said outer surface of said wheel rim, greater than one-fifth (1/5) of a diameter of said cylindrical wheel rim;

said cylindrical wheel rim further comprising two cylindrical sections connected to one another in concentric relation such that a cylindrical wheel rim is formed;

support means extending inward towards said center longitudinal axis, said support means mounted on said inner surface of said wheel rim;

a plurality of lugs mounted on said outer surface of said wheel rim;

each of said lugs comprising a longitudinally extended channel having a V-shaped cross-section, said channel further having an upper edge comprising the base of the V-shaped channel and two lower edges comprising the open edges of the V-shaped channel;

each of said lugs mounted on said outer surface of said wheel rim such that each of said lower edges is adjacent and connected to said outer surface; and each of said lugs having a length greater than said width of said wheel rim such that at least one end of each of said lugs may overhang at least one of said first and second edges of said wheel rim.

15. A wheel for use with agricultural and construction implements, said wheel comprising;

a generally cylindrical wheel rim having outer and inner surfaces, first and second edges and a center longitudinal axis;

said wheel rim having a generally flat cross-section;

said wheel rim further comprising first and second inwardly extending peripheral side flanges connected to said first and second edges respectively, such that additional rigidity may be imparted to said cylindrical wheel rim;

support means extending inward towards said center longitudinal axis, said support means mounted on said inner surface of said wheel rim;

a plurality of lugs mounted on said outer surface of said wheel rim;

each of said lugs comprising a longitudinally extended channel having a V-shaped cross-section, said channel further having an upper edge comprising the base of the V-shaped channel and two lower edges comprising the open edges of the V-shaped channel;

each of said lugs mounted on said outer surface of said wheel rim such that each of said lower edges is adjacent and connected to said outer surface;

each of said lugs extending substantially continuously across the entire width of said outer surface of said wheel rim;

each of said lugs extending substantially parallel with said center longitudinal axis of said wheel rim; and said wheel rim, said support means and said lugs comprising a metal material.

* * * * *